July 30, 1935. J. E. LONGLEY 2,009,406
BAND TESTING APPARATUS
Filed March 5, 1932 3 Sheets-Sheet 1
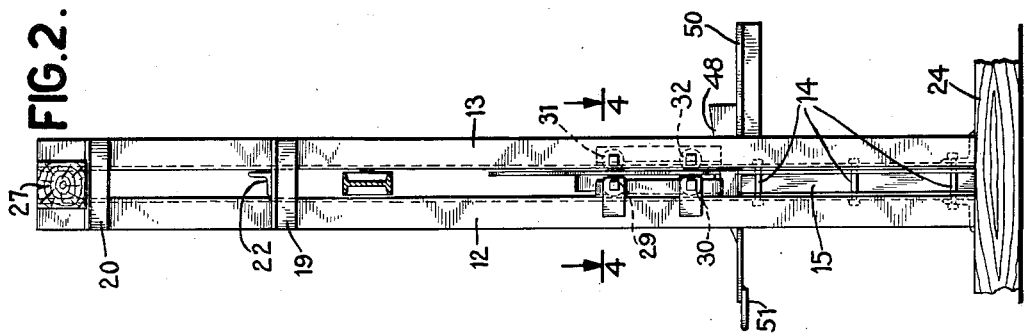
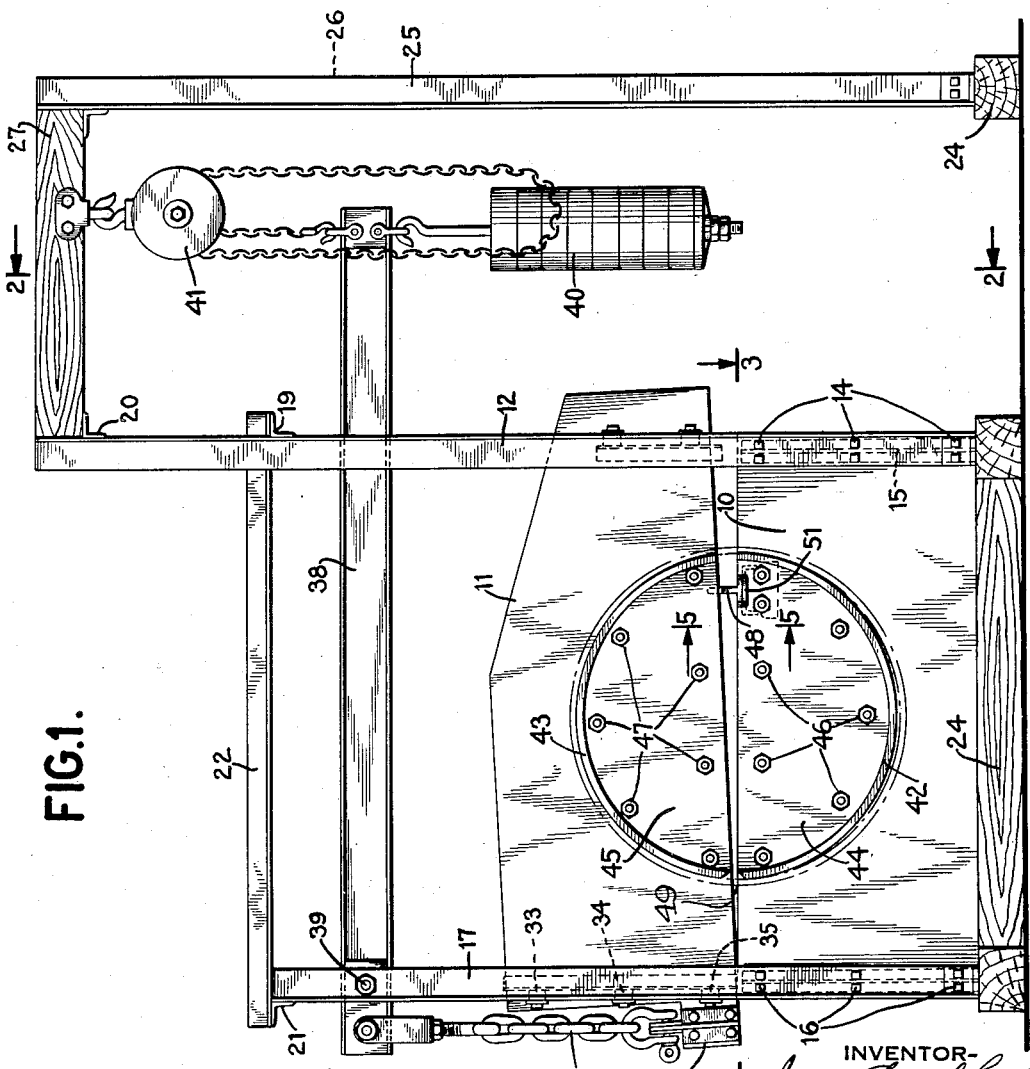

July 30, 1935.  J. E. LONGLEY  2,009,406
BAND TESTING APPARATUS
Filed March 5, 1932  3 Sheets-Sheet 2
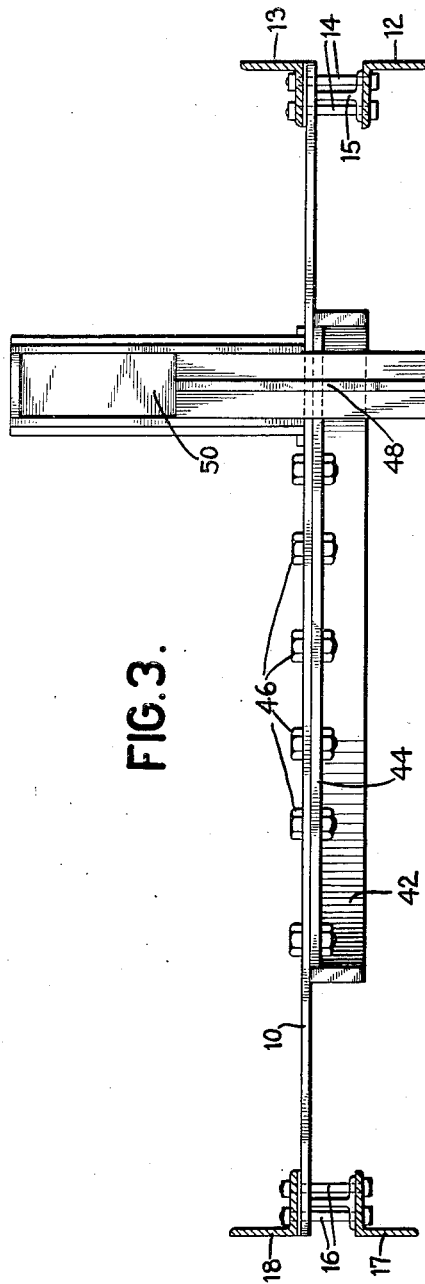
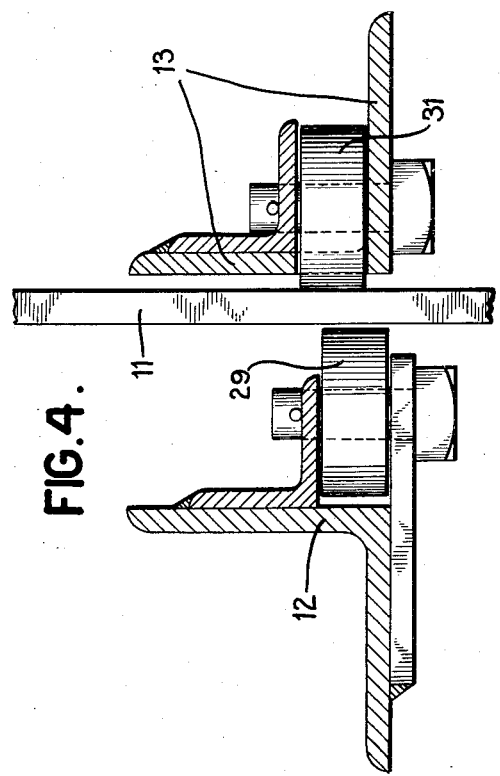
INVENTOR-
James Edward Longley
BY
Cooper, Kerr & Dunham
ATTORNEY-

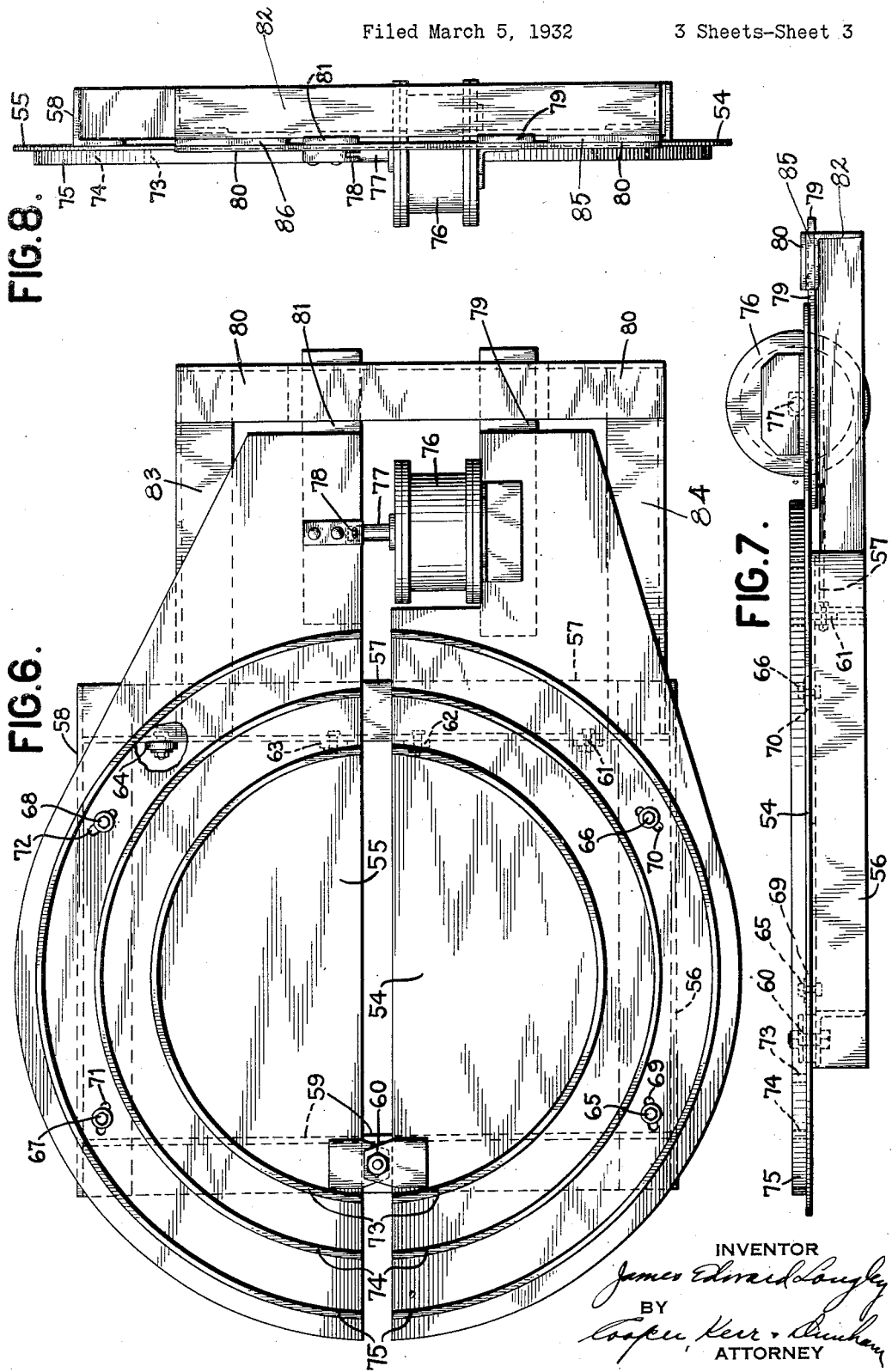

Patented July 30, 1935

2,009,406

UNITED STATES PATENT OFFICE 2,009,406

BAND TESTING APPARATUS

James Edward Longley, Verona, N. J., assignor to Lock Joint Pipe Company, East Orange, N. J., a corporation of New Jersey Application March 5, 1932, Serial No. 596,978

12 Claims. (Cl. 73—51)

This invention relates to apparatus for testing welded joints of bands.

In the reinforced concrete pipe industry it is common practice to weld the ends of circular bands. These bands serve as reinforcing and are spaced at short intervals along the axis of the pipe. They must be of uniform size and roundness and must all have a tensile strength not less than a certain minimum prescribed for the size and use of the particular pipe of which they are to be a part. A circular band is usually formed from straight stock which is cut to length and rolled into shape with ends abutting. The shape is trued and the ends welded together.

It has been the practice to test each weld by a device having jaws adapted to take hold of the band on either side of the weld and exert a known pull upon the welded joint. After the weld had withstood the test it was necessary again to true the shape of the band and to take out any kinks and deformities that might have been caused by the action of the testing machine and by its jaws.

Among the objects of this invention is to provide an apparatus by which a closed band may be subjected to tensile stress, tested and trued as to form in one operation and with the minimum amount of handling of the band.

Another object of the invention is to provide an apparatus of the class described which is adapted for accommodating bands of different diameters.

Other and more detailed objects will be pointed out hereinafter and in the accompanying specification and claims and shown in the drawings which, by way of illustration, show preferred embodiments of the invention.

Fig. 1 is an elevation of an apparatus embodying my invention.

Fig. 2 is a sectional view on line 2—2 of Fig. 1.

Fig. 3 is a horizontal view on line 3—3 of Fig. 1.

Fig. 4 is a detail section on line 4—4 of Fig. 2.

Fig. 5 is a detail section on line 5—5 of Fig. 1.

Fig. 6 is a plan of another apparatus embodying my invention.

Fig. 7 is a side view of the apparatus shown in Fig. 6, and

Fig. 8 is an end view of the apparatus shown in Fig. 6.

Having reference to Figs. 1 and 2, the apparatus comprises plates 10 and 11 mounted in such a manner as to enable relative movement therebetween in the plane of their surfaces. As seen in Fig. 1, the right hand end of plate 10 is fastened to two angle-irons 12, 13 which constitute a pair of standards of the frame which supports the entire apparatus. Bolts 14 pass through the two angle-irons 12 and 13, plate 10 and a spacing bar 15, Fig. 2. The left end of plate 10, as seen in Fig. 1, is similarly supported by means of bolts 16 which pass through a pair of vertically extending angle-irons 17 and 18. Angle-irons are convenient structural shapes and therefore have been utilized in the apparatus illustrated, but it is to be appreciated that structural members of other shapes and material may be utilized.

The two pairs of angle-irons 12, 13 and 17, 18 are maintained in spaced relation by means of short structural members 19, 20, 21 and a member 22 which extends between members 19 and 21. The lower ends of the vertically extending angle-iron members 12, 13, 17 and 18 are secured to a base 24 made up of several pieces of timber.

Another pair of vertically disposed angle-irons 25, 26 are provided for supporting a weight-carrying device in conjunction with angle-irons 12 and 13. These two pairs of angle-irons are joined at the top by beam 27 to which the weight-carrying device is attached. The parts thus far described, with the exception of plate 11, are all stationary members which contribute to the rigidity of the apparatus.

The right end of plate 11 is disposed between angle-irons 12 and 13, and the left end of the plate is disposed between angle-irons 17 and 18. In order to reduce friction, rollers are used to guide plate 11 in its movement towards and away from plate 10. These rollers are mounted on either side of the plate on standards 12, 13, 17 and 18. As seen in Fig. 2, rollers 29, 30 are carried by the angle-iron standard 12, and rollers 31 and 32 are carried by the angle-iron standard 13. Angle-irons 17 and 18 at the left end of the apparatus each carry three rollers 33, 34 and 35.

Plate 11 has an extension 36 to which is secured a chain 37. The upper end of this chain is connected to the left end of a balance beam 38 which is pivoted at 39 to angle-irons 17 and 18. The right end of balance beam 38 has hooked to it a weight 40 and lifting device 41. This lifting device is carried by beam 27 and is used to remove the effect of weight 40 from the beam when a band is to be removed from the apparatus or when the apparatus is not in use.

Each of plates 10 and 11 is part of a member having forms whose inside shapes correspond with the curvature of the band which is to be tested. Forms 42 and 43 are associated with the members including plate 10 and plate 11, respectively. While the forms could be permanently welded to plates 10 and 11, each form is welded to other plates 44, 45 which are detachably held in place upon plates 10 and 11 by means of bolts 46, 47. This arrangement affords simple means for permitting the interchange of forms whenever it is desired to test bands of shapes and sizes other than that for which the particular forms in use are suitable.

When the apparatus is not in use, the weight 40 is supported by the lifting device 41 and the left end of plate 11 is supported by plate 10. A pivot member 48 serves as the other support for plate 11. This pivot member is placed in the vicinity of the right ends of forms 42, 43 and acts as a fulcrum and support when a band is being tested.

In using the apparatus, a band is mounted in such a manner that the exterior surfaces of forms 42 and 43 engage the inner surface of the band, and the joint to be tested is disposed intermediate the ends of the two forms 42 and 43 at point 49. Having previously determined how much the weight at 40 should be to provide a desired pull at 49, the desired tension is applied to the band by permitting the weight 40 to be suspended from the right end of balance beam 38. As soon as one band is tested, the effect of the weight upon the balance beam 38 is removed while the tested band is removed and a new band is mounted in place.

Pivot member 48 is so shaped that the height of the pivot point of plate 11 may be varied by drawing the pivot member forward or by pushing it away from the operator. As clearly shown in Fig. 5, the upstanding flange of the pivot member is so tapered that a pull toward the operator will cause plate 11 to be raised and a push from the operator will cause plate 11 to be lowered. The pivot member is slidable on a shelf 50 and a handle 51 facilitates its handling by the operator.

The apparatus may be adjusted for use so that when the weight 40 is applied to the balance beam there will be but little movement of plate 11. However, should a band happen to be deformed to an unusual extent, the superficial area of the forms 42, 43 may be reduced by lowering the height of pivot member 48 to allow mounting of the band. Also when forms are to be used having sizes and shapes other than those shown, the adjustable pivot member will afford additional opportunity of setting the plates to suit the operator and the exigencies of the situation.

It is apparent that the principle of simultaneously trueing the band and testing the strength of its welded joint may be embodied in different forms. The apparatus which I have just described has certain features which may or may not be desirable for a particular job. For example, it might be satisfactory to use a pivot of a non-adjustable character and the forms 42, 43 can be permanently secured to plates 10, 11. Then again another kind of load-applying mechanism may be desired. In Figs. 6, 7 and 8, I have shown an apparatus which is intended to illustrate the manner of use of different instrumentalities. In this apparatus the testing and shaping members comprising plates 54, 55 are mounted in a horizontal plane upon a frame made up of angle iron members 56, 57, 58 and 59, which are rigidly connected together. A hinge 60 serves as a pivot between the two plates, and rollers 61, 62, 63 and 64 serve to support the plates opposite the points where welded joints are tested.

In order to insure stability and the maintaining of plates 54, 55 in their horizontal planes, pin and slot connections are provided between the plates and the frame. These pin and slot connections comprise bolts 65, 66 extending from angle-iron 56 and bolts 67 and 68 extending from angle-iron 58. Bolts 65 and 66 pass through slots 69 and 70, respectively, in plate 54, and bolts 67, 68 pass through slots 71 and 72 respectively, in plate 55. The centers or curvature of all these slots are at the center of hinge 60.

For purposes of convenience, the apparatus is provided with three sets of forms 73, 74 and 75 adapted to accommodate rings of different sizes. These forms are mounted concentrically and are welded to their associated plates.

The force-applying device may take any form and I have shown a pneumatic cylinder 76 mounted upon one of the plates 54. The piston 77 has a pin and slot connection 78 with the other plate 55. This device is so mounted that the force applied thereby will be effective in approximately the medial plane of the band which is to be tested.

The portion of plate 54 to which the pneumatic cylinder is attached carries a member 79 which extends between a bar 80 and a member 82. Member 81, extending from plate 55, likewise extends between bar 80 and member 82. Member 82 extends between the outer ends of members 83 and 84 which are in turn supported from the main frame composed of members 56, 57, 58 and 59. Bar 80 is spaced from member 82 by plates 85, 86 which are of such dimensions as to permit all necessary movement of members 79 and 81 and, hence, of plates 54, 55. The various rigidly connected members are welded at their joints.

Each of the apparatuses described has certain advantages peculiar to itself, but aside from the fact that the apparatus illustrated in Figs. 6, 7 and 8 occupies more floor space than the other, the remaining advantages may be availed of in either structure by utilizing those features of construction which are desired. The utilization of the principle involved in any manner saves much time and expense in that it obviates the necessity of trueing the band before as well as after the welding operation. The apparatus makes it possible to true the band just once and that is done at the time the weld is tested. It is apparent that bands of different shapes and materials may be satisfactorily trued and tested by an apparatus having forms of the proper shape and size.

The invention is capable of a wide variation and relationship of parts without departure from the nature and principle thereof and I do not restrict myself unessentially in the foregoing or other particulars, but contemplate such alterations and modifications within the scope of the appended claims as may be found to be advisable.

I claim:

1. An apparatus for testing the tensile strength of joints of bands, comprising in combination, a pair of plates, means supporting said plates in the same plane, one of said plates being permanently held in a fixed position and the second plate being limited to movement to and from the fixed plate, forms carried by said plates for engaging the inside surface of a band, a pivot member carried by said fixed plate, and weighted means for separating said plates by pivoting the movable plate on said pivot member until restrained by a band mounted on said band engaging forms.

2. An apparatus for testing the tensile strength of joints of bands, comprising in combination, a pair of plates, means supporting said plates in the same plane, one of said plates being permanently held in a fixed position and the second plate being limited to movement to and from the fixed plate, forms for engaging the inside surface of a band, said forms being detachably mounted on said plates for replacement by similar forms of a different shape, a pivot member supporting said movable plate, said pivot member being positionable for varying the spacing of said plates, and weighted means tending to rock the movable plate on said pivot member against the resistance of a band mounted on said band engaging forms.

3. An apparatus for testing the tensile strength of joints of closed bands, comprising in combination, a device for determining the strength of a joint in a closed band including a member for engaging the inner surface of a portion of a band, another member for engaging the inner surface of another portion of said band, means supporting said two members but permitting relative movement in the plane of a band engaged thereby, a pivot supporting one of said members for pivotal movement in relation to the other member, and means for tilting one of said members in relation to the other to strain a joint in the circumference of a band in engagement with said members under a tensile stress proportional to a measured tilting load acting upon said means.

4. An apparatus for testing the tensile strength of joints of closed bands, comprising in combination, a member for engaging the inner surface of a portion of a band, said member being mounted in a fixed position, a second member adapted to engage the inner surface of another portion of said band, means supporting said second member to move in the plane of said first member, a pivot upon which said second member may rock in relation to said first member, and means for first rocking said second member in relation to said first member until they are brought into engagement with the band to be tested and then applying a predetermined force in opposition to the reaction of the band against further separation of said members.

5. An apparatus for testing the tensile strength of joints of closed bands, comprising in combination, a member for engaging the inner surface of a portion of a band, said member being mounted in a fixed position, a second member adapted to engage the inner surface of another portion of said band, means supporting said second member to move in the plane of said first member, a pivot upon which said second member may rock in relation to said first member, said pivot being variable in height for enabling changes in the superficial area covered by said members, and means for rocking said second member to engage and exert tensile stress on the band engaged by both of said members.

6. An apparatus for testing the tensile strength of joints of closed bands comprising, in combination, a horizontal frame, plates mounted thereon and having forms for engaging portions of the inner surface of a band to be tested, and means for rocking said plates against the action of the joint of a band lying upon said plates, said means comprising a hinge connecting the plates in the vicinity of the band, and means for first separating said plates until the forms are brought into engagement with the band to be tested and then applying a predetermined force in opposition to the reaction of the band against further separation of the plates.

7. Apparatus for applying a measured force to a closed band for testing the tensile strength of a portion of the band, such as a joint in the circumference of the band, comprising, in combination, a device for exerting tensile stress on a joint in the circumference of a band, including forms for engaging the inner surface of the band upon both sides of the portion to be tested, said forms being pivotally mounted in respect to each other in the vicinity of a portion of the band removed from the portion to be tested so that only the portion of the band which is to be tested will be subjected to substantial tensile stress in opposition to any tendency to separate the forms by rocking them in respect to each other, and force exerting means having connection with one of the forms for exerting a rocking tendency thereon so as to apply a predetermined tension to the portion of the band to be tested.

8. Apparatus for applying a measured force to a closed band for testing the tensile strength of a portion of the band, such as a joint in the circumference of the band, comprising, in combination, a device for exerting tensile stress on a joint in the circumference of a band, including a pair of forms for engaging the inner surface of the band, means supporting said forms to enable rocking therebetween at one end of the forms and separation of the other end of the forms adjacent a joint in the band supported by the forms, and force exerting means for causing the joint of the band to restrain pivotal movement of the forms in respect to each other by a predetermined force proportional to the force exerted by the force exerting means.

9. In combination, a device for determining the strength of a joint in a band comprising a pair of forms disposed within the band, lever means supporting one of said forms in pivotal relation to the other and fulcrumed at a point remote from the joint in the band, and force exerting means having connection with said lever means to tilt the same upon its fulcrum and to apply stress to the joint of the band in proportion to the force exerted by the force exerting means.

10. In combination, a device for determining the strength of a joint in a band comprising joint straining elements disposed within the band and so mounted in respect to each other as to effect more strain on a single segment of the band than at any other segment of the band, means for shifting one of said elements away from the other to strain the band, a force applying device for so shifting one of said elements away from the other and to test the said single segment of the band for strength by applying tensile stress thereto in known relation to the force acting through said force applying device, and means for removing the effect of the force applying device upon the band to relieve the band from all strain.

11. In combination, a device for determining the strength of a joint in a band comprising a pair of forms disposed within the band and fulcrumed at a point remote from the joint so as to enable the application of measurable stress to the joint when a tipping load is applied to one of said forms, and means for applying a measured tipping load to one of the forms to strain the joint of the band an amount proportional to the tipping load so as to obtain an indication of the strength of the joint.

12. In combination, a device for determining the strength of a joint in a band including a pair of forms disposed within the band and fulcrumed at a point remote from the joint for pivotal movement in respect to each other, balance means having connection with one of said forms at a point outside of the band upon the forms, and means operating upon said balance, means for applying a measured tipping load to said fulcrumed forms to strain the joint by an amount proportional to the tipping load so as to obtain an indication of the strength of the joint.

JAMES EDWARD LONGLEY.